United States Patent [19]
Paratore

[11] Patent Number: 5,818,027
[45] Date of Patent: Oct. 6, 1998

[54] CONTROL CIRCUIT FOR A BAR CODE SCANNER

[75] Inventor: Robert M. Paratore, Woodenville, Wash.

[73] Assignee: Intermec Corporation, Everett, Wash.

[21] Appl. No.: 755,089

[22] Filed: Nov. 22, 1996

[51] Int. Cl.[6] .................................................. G06K 7/10
[52] U.S. Cl. .................................... 235/472; 235/462
[58] Field of Search ..................................... 235/472, 462

[56] References Cited

U.S. PATENT DOCUMENTS

| | | | |
|---|---|---|---|
| 3,699,312 | 10/1972 | Jones et al. ............................... | 235/250 |
| 4,593,186 | 6/1986 | Swartz et al. ............................ | 235/472 |
| 4,758,717 | 7/1988 | Shepard et al. .......................... | 235/472 |
| 5,017,765 | 5/1991 | Shepard et al. .......................... | 235/462 |
| 5,130,520 | 7/1992 | Shepard et al. .......................... | 235/472 |
| 5,180,904 | 1/1993 | Shepard et al. .......................... | 235/470 |
| 5,262,628 | 11/1993 | Shepard et al. .......................... | 235/472 |
| 5,321,246 | 6/1994 | Shepard et al. .......................... | 235/472 |
| 5,329,104 | 7/1994 | Ouchi et al. .............................. | 235/472 |
| 5,346,055 | 5/1995 | Shepard et al. .......................... | 235/472 |

*Primary Examiner*—Harold Pitts
*Attorney, Agent, or Firm*—M. Michael Carpenter

[57] ABSTRACT

A circuit is shown for use with a bar code scanner wherein the scanner includes a laser for producing a beam of light that is scanned across the bar code so that the light reflected from the bar code may be focused upon a sensor which produces an electrical signal representing the bar code. Scanning is stopped by a first circuit after a predetermined number of scans. Thereafter, a second circuit completes the decoding of the electrical signal and outputs the results if that decoding is successful. If not, a third circuit restarts the scanning within the first circuit.

17 Claims, 3 Drawing Sheets

CONTROL CIRCUIT FOR A BAR CODE SCANNER

BACKGROUND OF THE INVENTION

1. Field of the Invention

The present invention relates to a circuit that turns off a bar code scanner after a predetermined number of scans and, more particularly, to a circuit and method for scanning bar code that protects battery-powered scanners from power drain and data loss.

2. Description of the Prior Art

It is well known in the art of bar code scanning that a scanner, either bench mounted or hand held, may be arranged to scan a beam of light across a bar code only once, with such scanning initiated either manually or automatically.

Another prior art circuit and method teaches the concept of scanning a beam of light across a bar code on the order of 200 times. This method generates a plurality of scans which continue until a successful decode signal has been generated. The decode signal is then applied to an indicator and used to terminate the scanning. This prior art scanning method also includes a safety feature, in the form of a safety timer, that is actuated at the commencement of the scanning and remains on for a period of time, five minutes, before shutting down the laser tube generating the scanning beam of light. If the scanner is actuated a second time during the first five-minute period, the timing circuit will start another five-minute period before automatically shutting down the laser.

This same prior art teaches that it is possible to initiate a scan by actuation of a trigger which continues the scanning repetitively until a good scan decode signal has been generated or the trigger is released. This approach may be referred to as level trigger logic. Alternatively, a trigger pull starts the scan which continues until a good scan decode has been generated or until the trigger is pulled a second time. This approach is referred to as edge trigger logic.

In short, the prior art teaches the concept of scanning a bar code with a scanner to generate an electrical signal, decoding the electrical signal, and terminating the scanning in response to a successful decode.

SUMMARY OF THE INVENTION

Accordingly, it is an object of the present invention to provide an improved circuit for terminating the scanning of a bar code scanner.

Another object of the present invention is to provide an improved scanning termination circuit that will protect the battery of a scanner.

A further object of the present invention is to provide an improved circuit that provides for the termination of scanning without concern for whether a bar code has been decoded or not, thus protecting the battery power supply of the scanner from premature drain and, more importantly, the data accumulated within the scanner from loss.

In accomplishing these and other objects, there has been provided a bar code scanner having a source of electromagnetic energy, such as a laser, that produces a beam of light. The beam of light is scanned across the bar code and reflected from that bar code to permit a sensor to receive the reflected light for generating an electrical signal representing the bar code. The scanner is controlled by a first circuit that starts the scanning after actuation of a trigger, for example, and terminates the scanning after a predetermined number of scans. A second circuit receives the electrical signal representative of the bar code and checks for proper decoding or completes the decoding after the scanning has been stopped.

By stopping the scanning before determining if the electrical signal representing the bar code has been decoded, the controller of the bar code scanner is prevented from freezing in an on position while the termination circuitry is still looking for a successful bar code decode. When a controller freezes in the prior art, the battery within the frozen scanner may be drained and data lost. To complete the circuit of the present invention, a third circuit is provided which starts the scanning anew if it is determined that there has been an unsuccessful decode of the electrical signal representing the bar code.

In summary, the present invention, instead of teaching the concept of scanning, decoding the resultant signal, and stopping upon a successful decode, teaches the concept of scanning, stopping and then checking for an unsuccessful decode before starting to scan anew. When employed within systems that have a nonworkable interruption structure, this approach protects the battery within the bar code scanner and the data stored therein.

DESCRIPTION OF THE DRAWINGS

The benefits and advantages of the present invention will be better understood after reference to the following specification and drawings, wherein.

DESCRIPTION OF THE PREFERRED EMBODIMENT

Figure 1:
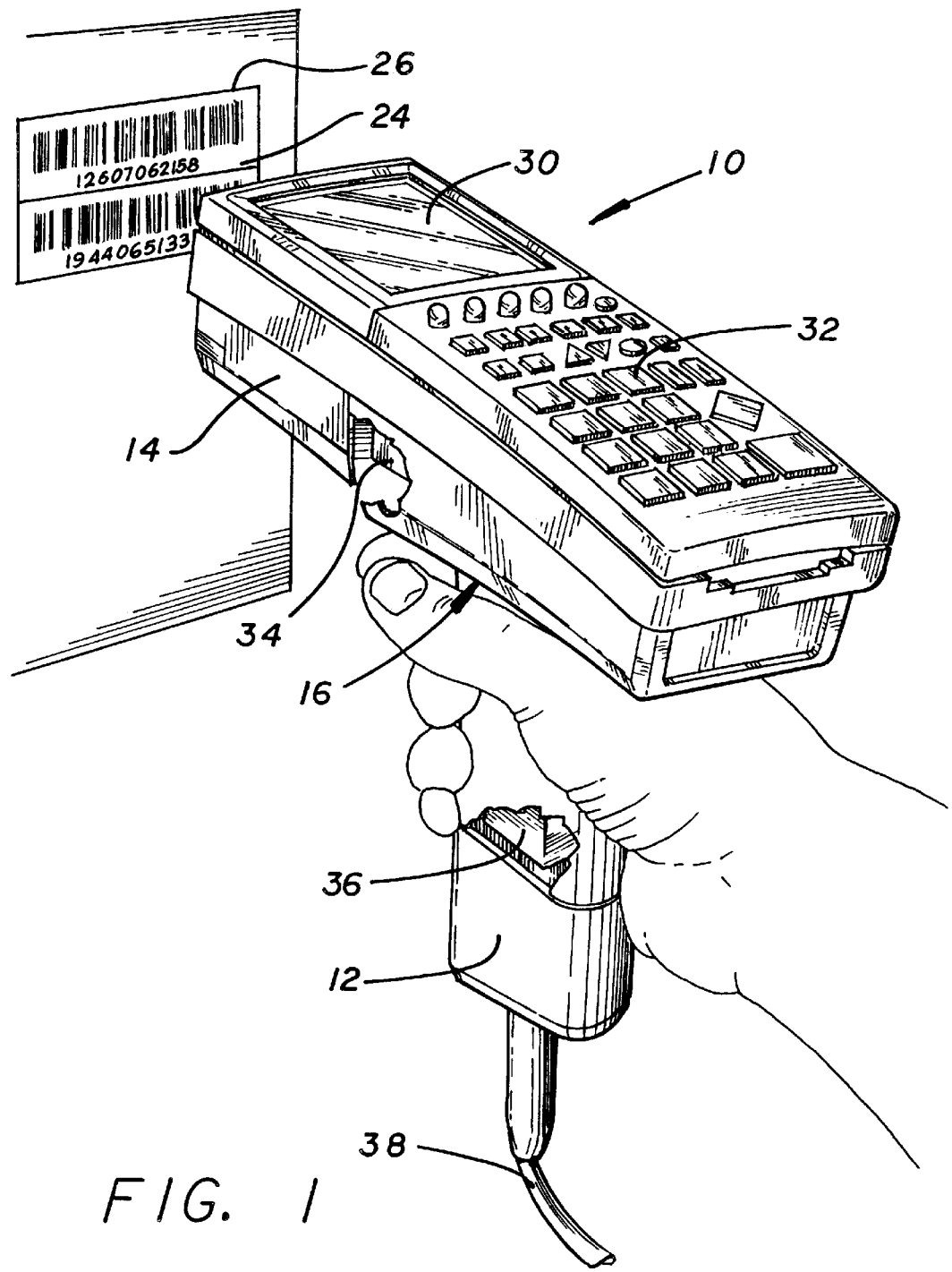
FIG. 1 is a perspective view showing a bar code scanner being used to scan a bar code.

Referring now to the drawings, a bar code scanner, such as a hand-held scanner 10, is shown in FIG. 1 having a pistol-grip handle 12 mounted beneath a generally rectangular housing 14. The scanner 10 is actuated by depressing a trigger 16 located at the interface of the handle 12 and housing 14. Mounted within housing 14 is a scan engine 20, best seen in FIG. 2, which generates a beam of light 22 toward a bar code 24 which, for example, may be placed upon a label 26. The light beam 22 is, in turn, reflected from the surface of label 26 by the variations of non-reflective ink or other material on label 26 that form the bar code 24. The reflected field of view 28 is, in turn, read by the scan engine 20 within scanner 10.

Scanner 10 may consist of a simple hand-held scanning device with the scan engine 20 for reading bar code 24. Alternatively, the hand-held scanner 10 may include a display 30 and a data-entry keyboard 32. The housing 14 generally includes electronics for driving the scan engine 20 and for processing the information contained within the reflected field of view 28. In addition, more complex electronics, in the form of a computer 34, may be placed within housing 14. Finally, handle 12 may be equipped with a suitable battery 36 for powering the hand-held scanner 10 or power may be provided by a cable 38, connected between handle 12 and a suitable power pack which may alternatively include the computer. The power pack, not shown, may be worn on a user's belt, as is well known.

Figure 2:
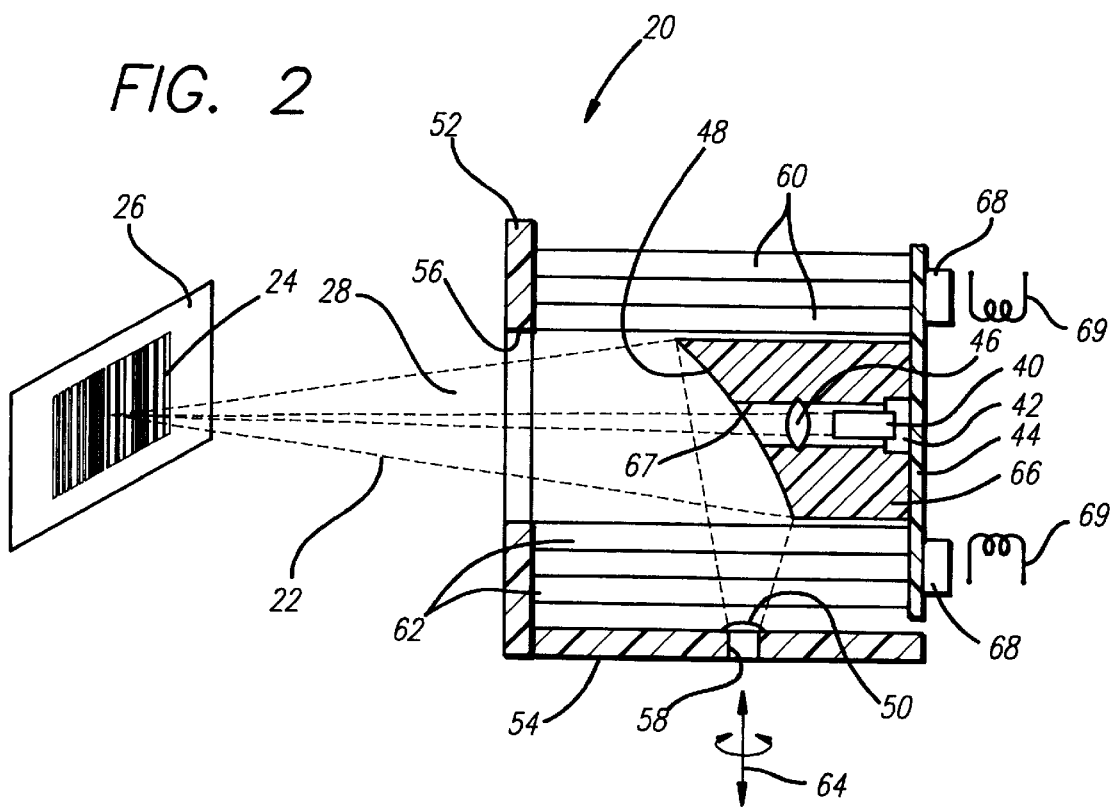
FIG. 2 is a side view of a typical scan engine used within the bar code scanner of FIG. 1 for scanning a beam of light across the bar code.

As seen in FIG. 2, the scan engine 20 consists of a light source, such as a laser diode 40, mounted within a mounting housing 42 attached to a floating printed circuit board 44. Optics, such as lens 46, are used to focus the culminated light from laser 40 into the beam of light 22 and on to the bar code 24. Surrounding the laser 40 and its associated optics 46 is a spherical collecting mirror 48 which, although it has a generally spherical surface, is arranged at substantially 45 degrees to the axis of the beam of light 22. Thus, spherical collecting mirror 48 functions to direct the reflected field of view 28 at 90 degrees to the axis of the beam of light 22 down toward a sensor, such as photocell 50.

Scan engine 20 is mechanically assembled by utilizing a pair of printed circuit boards 52 and 54 which are mounted at right angles to one another. Printed circuit board 52 is provided with an aperture 56 through which the beam of light 22 and the reflected field of view 28 may pass. Printed circuit board 54 is, in turn, provided with an aperture 58 which provides for mounting the sensor 50, as well as access for the wiring of the sensor. Extending from the inner surface of the printed circuit board 52 are two sets of paired flexures 60 and 62 which mount the floating printed circuit board 44 for oscillating movement in the Y and Z planes, as seen in FIG. 2, about an axis of rotation 64 which passes through the center of sensor 50. The spherical collection mirror 48 may be formed on the spherical surface of a piece of lightweight plastic 66 having a central bore 67 into which is mounted the laser 40 and its mounting 42. Also mounted in bore 67 is the lens 46 that forms the optics for scan engine 20. Alternatively, the spherical mirror 48 may be mounted on a thin spherical, plastic surface which, in turn, is attached to a plastic tube whose inner diameter forms the bore 67 for mounting lens 46 and housing 42. Suitable magnets 68 may be attached to the printed circuit board 44 and driven by a coil or coils 69 to impart an oscillating motion to the printed circuit board 44, laser 40, lens 46 and mirror 48. It will now be seen that such oscillation will cause the beam of light 22 to sweep back and forth across the bar code 24 about the axis of rotation 64. The scan engine 20 is further described in U.S. Pat. No. 5,015,831, issued May 14, 1991, at FIG. 10.

Figure 3:
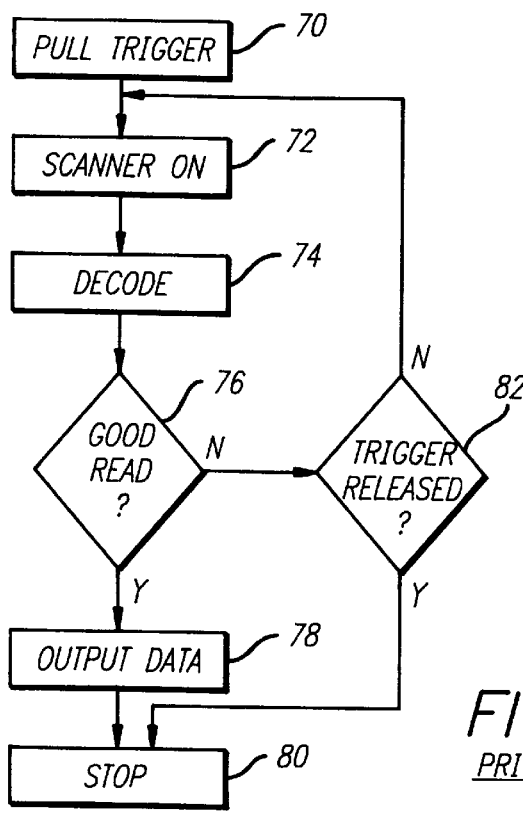
FIG. 3 is a schematic circuit diagram showing the automatic termination circuit of the prior art.

Referring now to FIG. 3, the automatic termination circuitry of the prior art is shown, including a pull trigger circuit 70 that generates a signal when the trigger 16 has been pulled. A signal from the pull trigger circuit 70 energizes a scanner on circuit 72 to initiate scanning by applying an alternating current, for example, to the coils 69 of the scan engine 20. The reflected field of view 28 applies varying intensities of light to sensor 50 for generating an electrical signal which is decoded within a decode circuit 74. Scanning continues until a good read circuit 76 evaluates the information from decode circuit 74 and generates a positive or "Y" response, indicating that a successful decode has been obtained. The signal from the good read circuit 76 is then applied to an output data circuit 78 to cause that circuit to output its data and to pass an indication of that successful data output onto a stop circuit 80. It will be seen that the prior art circuit of FIG. 3 causes the scan engine 20 to stop after a successful read or bar code decode has been accomplished. The scanning may also be stopped upon release of trigger 16 by a trigger released circuit 82 whose input is connected to the negative or "N" terminal of the good read circuit 76 and whose positive output or "Y" signal is applied to the stop circuit 80. The trigger released circuit 82 has a negative or "N" terminal connected to the pull trigger circuit 70 to continue the scanning until the trigger 16 is released. It may now be understood that the circuit shown in FIG. 3 only stops the scan function of scan engine 20 after a successful decode of the bar code signal as sensed by the good read circuit 76 or after the trigger 16 is released as sensed by the trigger released circuit 82.

Also taught by the prior art, but not shown in FIG. 3, is a timing circuit that continues the scanning of a scanner until an elapse of a predetermined time period. In this prior art arrangement, the scanner is said to terminate the reading of each symbol upon the determination of no successful decode and upon the elapse of a predetermined time period.

As discussed above, the prior art teaches a circuit that scans a bar code, looks for a successful decode and terminates the scanning upon the generation of a successful decode. The problem with this circuit is that a failure can occur before the successful decode. In such a situation, the battery 36 of the scanner 10 may be drained and the data stored within computer 34 may be lost.

Figure 4:
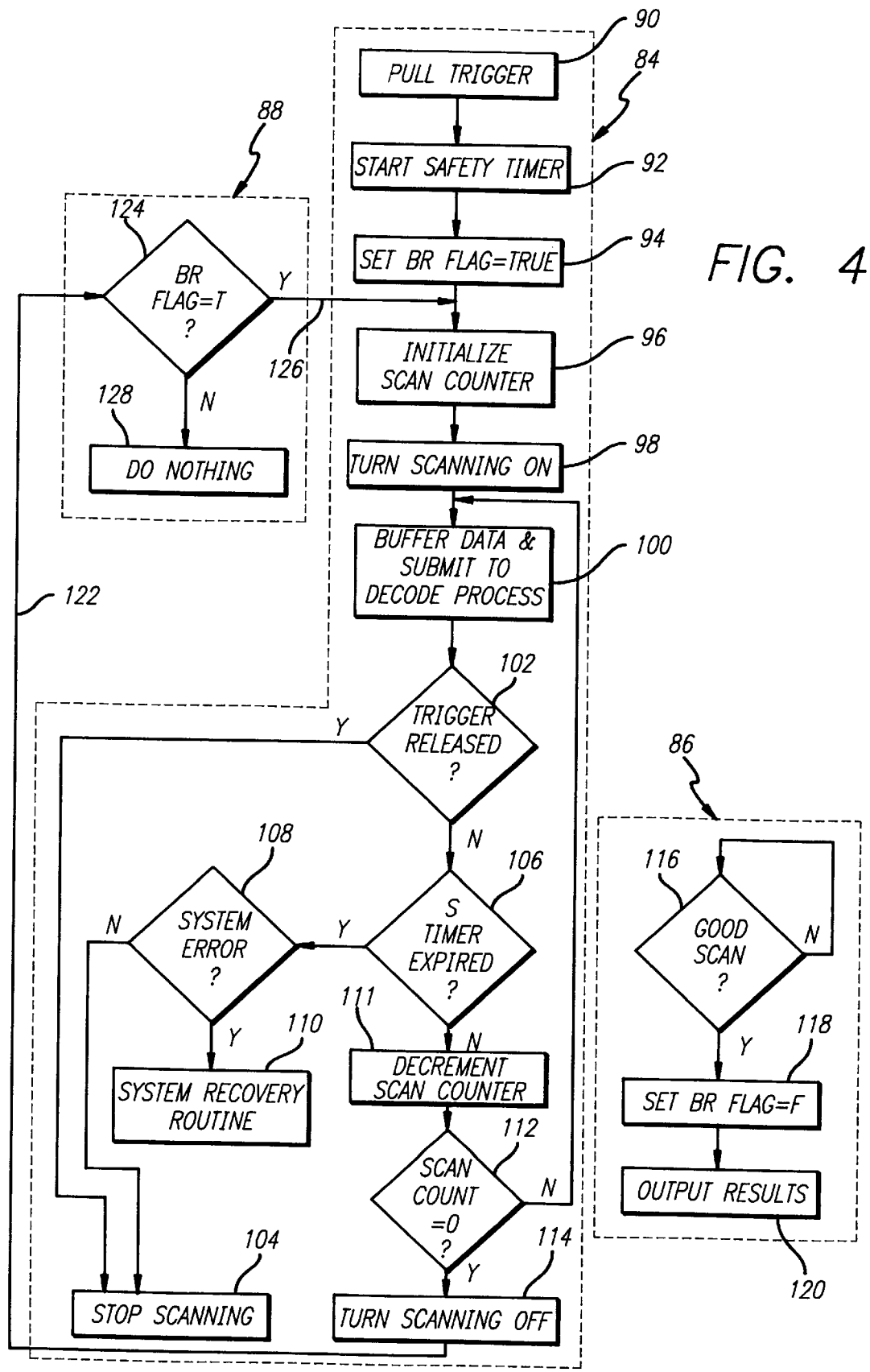
FIG. 4 is a schematic circuit diagram showing the timed out circuit of the present invention.

Referring now to FIG. 4, the improved scanning termination circuit of the present invention is shown, including a first circuit 84 that initiates scanning of the scan engine 20, stores the data, starts the decode process, and terminates the scanning; a second circuit 86 for completing the decode process and indicating a successful decode; and a third circuit 88 for starting the scanning of scan engine 20 if the second circuit 86 has been unsuccessful in decoding. These three circuits carry out the function of stopping the scan, decoding the information and starting the scan again if there is an unsuccessful decode. This inventive arrangement prevents the controls of scanner 10 from failing in a mode where the scanner will continue to scan looking for a successful decode until the battery 36 has failed resulting in the loss of data within the computer 34.

The first circuit 84 includes a pull trigger circuit 90 energized when trigger 16 is actuated. Connected to pull trigger circuit 90 is a start safety timer circuit 92 which permits the operation of the scanner 10 for a predetermined period of time before it is turned off. The time period is variable, from one second to four minutes, but, in the preferred embodiment, is five seconds. Pull trigger circuit 90 also energizes a set bad read flag to true circuit 94 and turns on an initialize scan counter circuit 96 and a turn scanning on circuit 98. After initialization of the scan by energizing circuits 96 and 98, the scan engine 20, in the preferred embodiment, will scan four times in a time period of 120 msec. As scanning continues, a buffer data and submit to decode process circuit 100 begins to store the data obtained by sensor 50 and starts the decode process. During the four scans, the first circuit 84 continues to monitor whether the trigger has been pulled by a trigger release circuit 102 whose positive or "Y" output, indicating that the trigger has been released, will initiate a signal to a stop scanning circuit 104 for terminating the scan. If the trigger has not been released, the negative or "N" signal from circuit 102 is applied to a safety timer expired circuit 106 whose positive or "Y" output is applied to a system error circuit 108 whose negative or "N" output is applied to the stop circuit 104. The positive or "Y" output of the system error circuit 108 is applied to a system recovery routine circuit 110.

The negative or "N" output of the safety timer expired circuit 106 is attached to a decrement scan counter circuit 111 which counts down the scans, in the present embodiment, from four to zero. The document scan counter circuit 111 connects to a scan count circuit 112 which produces a positive or "Y" output when the scan count reaches zero. The "Y" output of circuit 112 is applied to a turn scanning off circuit 114, while the negative or "N" output is applied as a feedback to the input of the buffer data and submit to decode process circuit 100.

It will now be seen that actuation of trigger 16 causes the pull trigger circuit 90 to initiate four circuits: the start safety timer circuit 92, the set bad read flag circuit 94 (which sets the flag to true), the initialize scan count circuit 96, and the turn scanning on circuit 98. Once scanning commences, the buffer data and submit to decode process circuit 100 begins to store the data and waits until the first scan is complete. Monitoring is accomplished by the trigger release circuit 102 which, if the trigger is released before the four scans have terminated, will turn off the scanner at circuit 104. If the trigger has not been released after four scans, the circuit 106 queries whether the safety timer has expired. If it has not, the circuit 112 queries whether the scan count has dropped from the four scans to zero, in the preferred embodiment. If it has, scanning is turned off at turn scanning off circuit 114. If the count has not reached zero, the feedback loop between circuit 112 and the input of buffer data and submit to decode process circuit 100 continues the scan. If the safety timer circuit 106 indicates an expiration of time, then the system error circuit 108 queries whether there has been an error and starts a system recovery routine in circuit 110 if time has expired and an error is found. If no error is found, the stop scanning circuit 104 is actuated to satisfy the five seconds controlled by the start safety timer circuit 92 and the safety timer expired circuit 106.

Once the first circuit 84 has stopped the scanning of scan engine 20, the second circuit 86, asynchronously controlled from first circuit 84, is queried. Circuit 86 consists of a good read scan circuit 116 having a positive "Y" and negative "N" output. If the output is negative indicating no good read, the good scan circuit 116 continues looking for a good scan. Once a good scan has been obtained, the output from the good scan circuit 116 is applied to a set bad read flag to true circuit 118 which, in turn, sets an output results circuit 120 to output the decoded bar code data. The output of this data under control of circuit 120 occurs after the first circuit 84 and its turn scanning off circuit 114 have shut down the scan engine 20.

After the first circuit 84 has shut down the scan engine 20 and the second circuit 86 indicates an unsuccessful decode, a signal is applied through loop 122 from the turn scanning off circuit 114 to the input of the third circuit 88 which restarts the scan engine 20. Input from loop 122 is applied to the input of third circuit 88 at a bad read flag equal true circuit 124 which has two outputs. If the bad read flag equals true, a first, positive output "Y" is applied by a loop 126 to the input of the initialized scan counter 96 of the first circuit 84 to restart the scan cycle described above. If the bad read flag equals true circuit 124 receives a reading from circuit 118 indicating that this condition is not correct, a second, negative output "N" is applied to a stand down or do nothing circuit 128, which retains the scanning process at a stop until trigger 16 is pulled to activate the pull trigger circuit 90. In the preferred embodiment, the time between turning off the scan at the turn scanning off circuit 114 and starting the scanning again at the output from the third circuit 88 in the event of a bad read flag equals false reading from circuit 118 is 100 nsec.

In summary, it will be seen that the present invention utilizes the approach of scanning, turning off the scan, checking for a successful scan, and, in the event of an unsuccessful scan, restarting the scanning. While the preferred embodiment has been described in detail, including the detail of the first, second and third circuits, it will be understood that other variations of circuitry are possible within the teachings of the present invention which should be limited only by the dependent claims.

I claim:

1. A bar code scanner, comprising:

a source of electromagnetic energy for producing a beam of light, a scanner for scanning said beam of light across said bar code, a sensor for receiving said beam of light as it is reflected from said bar code for generating an electrical signal representative of said bar code, a first circuit for stopping said scanning after a predetermined number of scans, a second circuit for receiving said electrical signal representative of said bar code and for outputting a successful decode of said electrical signal, and a third circuit for starting said scanner for scanning said beam of light across said bar code if said second circuit has been unsuccessful in decoding said electrical signal.

2. A bar code scanner as claimed in claim 1, additionally comprising:

optics for focusing said beam of light toward said bar code to illuminate said bar code and reflect said light therefrom.

3. A bar code scanner as claimed in claim 1, additionally comprising:

said second circuit asynchronously controlled with respect to said first circuit.

4. A bar code scanner as claimed in claim 1, wherein:

said source of electromagnetic energy is a laser.

5. A bar code scanner as claimed in claim 1, wherein said first circuit comprises:

a trigger pull circuit connected to a start safety timer circuit connected to a set bad read flag circuit connected to an initialize scan counter circuit connected to a turn scanning on circuit connected to a buffer data and submit to decode process circuit connected to a trigger release circuit connected to a safety timer expired circuit connected to a scan counter circuit connected to a turn scanning off circuit.

6. A bar code scanner as claimed in claim 1, wherein said second circuit comprises:

a good scan circuit connected to a set bad read flag circuit connected to an output results of decode processor circuit.

7. A bar code scanner as claimed in claim 1, wherein said third circuit comprises:

a bad read flag monitoring circuit connected to a stand down circuit.

8. A bar code scanner as claimed in claim 5, wherein said first circuit additionally comprises:

a stop scan circuit connected to said trigger release circuit, and a system error circuit connected between said safety timer expired circuit and said stop scan circuit.

9. A hand-held bar code scanner, comprising:

a source of electromagnetic energy for producing a beam of light, a scanner for scanning said light beam across said bar code, optics for focusing said beam of light toward said bar code to illuminate said bar code which is reflected as a field of view, a sensor for receiving said reflected field of view and for generating an electrical signal representative of said bar code viewed within said field of view by said sensor, a first circuit for stopping said scanning after a predetermined number of scans, a second circuit, asynchronous from said first circuit, for receiving said electrical signal representative of said bar code and for outputting a successful decode of said electrical signal, and a third circuit for starting said scanner for scanning said light beam across said bar code if said second circuit has been unsuccessful in decoding said electrical signal.

10. A hand-held bar code scanner as claimed in claim 9, wherein said first circuit comprises:

a trigger pull circuit connected to a start safety timer circuit connected to a set bad read flag circuit connected to an initialize scan counter circuit connected to a turn scanning on circuit connected to a buffer data and submit to decode process circuit connected to a trigger release circuit connected to a safety timer expired circuit connected to a scan counter circuit connected to a turn scanning off circuit.

11. A hand-held bar code scanner as claimed in claim 9, wherein said second circuit comprises:

a good scan circuit connected to a set bad read flag circuit connected to an output results of decode processor circuit.

12. A hand-held bar code scanner as claimed in claim 9, wherein said third circuit comprises:

a bad read flag monitoring circuit connected to a stand down circuit.

13. A hand-held bar code scanner as claimed in claim 10, wherein said first circuit additionally comprises:

a stop scan circuit connected to said trigger release circuit, and a system error circuit connected between said safety timer expired circuit and said stop scan circuit.

14. A hand-held bar code scanner as claimed in claim 10, wherein:

said source of electromagnetic energy is a laser.

15. A method for scanning a bar code, comprising the steps of:

producing a beam of light, scanning said beam of light across said bar code, receiving said beam of light reflected from said bar code and generating an electrical signal representative of said bar code, stopping said scanning after a predetermined number of scans, receiving said electrical signal representative of said bar code and decoding said electrical signal, and starting said scanning of said beam of light across said bar code if said second circuit has been unsuccessful in decoding said electrical signal.

16. The method of claim 15, additionally comprising the step of:

focusing said beam of light toward said bar code to illuminate said bar code and reflect said light therefrom.

17. The method of claim 15, wherein:

said step of receiving said electrical signal is asynchronous from said step of stopping said scanning.

* * * * *